United States Patent
Chang et al.

(10) Patent No.: US 8,151,639 B2
(45) Date of Patent: Apr. 10, 2012

(54) QUICK TEST TOOL AND METHOD OF AIRCRAFT AIRSPEED INDICATOR

(75) Inventors: Jae Won Chang, Daejeon-si (KR); Kie Jeong Seong, Daejeon-si (KR); Sang Jong Lee, Daejeon-si (KR); Sang Man Moon, Daejeon-si (KR); Hyoun Kyoung Kim, Daejeon-si (KR); Il Kyung Park, Daejeon-si (KR); Byoung Ho Jeon, Daejeon-si (KR)

(73) Assignee: Korea Aerospace Research Institute (KR)

( * ) Notice: Subject to any disclaimer, the term of this patent is extended or adjusted under 35 U.S.C. 154(b) by 377 days.

(21) Appl. No.: 12/581,022

(22) Filed: Oct. 16, 2009

(65) Prior Publication Data

US 2010/0162787 A1 Jul. 1, 2010

(30) Foreign Application Priority Data

Dec. 31, 2008 (KR) .................. 10-2008-0138384

(51) Int. Cl.
*G01F 1/46* (2006.01)
*G01P 21/00* (2006.01)
(52) U.S. Cl. ......... 73/170.02; 73/1.16; 73/1.19; 73/1.29
(58) Field of Classification Search .................. None
See application file for complete search history.

(56) References Cited

U.S. PATENT DOCUMENTS

| | | | |
|---|---|---|---|
| 4,603,823 A * | 8/1986 | Ayoub ................. 244/122 AE |
| 4,617,826 A * | 10/1986 | Hagen ............................. 73/182 |
| 2005/0252288 A1* | 11/2005 | Giterman .................. 73/170.02 |

FOREIGN PATENT DOCUMENTS

| | | |
|---|---|---|
| KR | 10-1993-014762 | 7/1993 |
| KR | 1019990050668 | 7/1999 |
| KR | 10-0326662 | 2/2002 |
| KR | 1020030012706 | 2/2003 |

\* cited by examiner

*Primary Examiner* — Andre Allen
(74) *Attorney, Agent, or Firm* — Hayes Soloway P.C.

(57) ABSTRACT

Provided is a test tool for an airspeed indicator of an aircraft, including: a cylinder portion including an insertion groove with a predetermined amount of space, and of which one end is sealed by a cover and includes an injection portion on the cover so that the insertion groove passes through a pitot tube, and of which another open end includes a protruded step around its inner circumferential surface; a piston portion being inserted into the insertion groove to reciprocally move within the insertion groove, and including a protrusion portion having a size and a shape corresponding to an aperture of the insertion groove, and a bar-shaped knob portion being extended from the protrusion portion; and a display portion being formed of a transparent material on an outer surface of the cylinder portion to display a location of the protrusion portion reciprocally moving within the cylinder portion.

6 Claims, 4 Drawing Sheets

QUICK TEST TOOL AND METHOD OF AIRCRAFT AIRSPEED INDICATOR

CROSS-REFERENCE TO RELATED APPLICATION

This application claims the benefit of Korean Patent Application No. 10-2008-0138384, filed on Dec. 31, 2008, in the Korean Intellectual Property Office, the disclosure of which is incorporated herein by reference.

BACKGROUND

1. Field of the Invention

The present invention relates to a test tool and method for an airspeed indicator to of an aircraft, and more particularly, to a test tool and method for an airspeed indicator of an aircraft that may be connected to a pitot tube of the aircraft to easily test the airspeed indicator of the aircraft using the air pressure of the aircraft.

2. Description of the Related Art

One of the most important instruments for a navigation of an aircraft is an airspeed indicator to provide a pilot with airspeed information of the aircraft.

Generally, airspeed of the aircraft may be calculated using a scheme different from a vehicle velocity calculation scheme. Initially, a velocity of a vehicle is calculated by dividing a travel distance by a time, whereas the airspeed of the aircraft is calculated by including the effect of wind. Accordingly, the airspeed of the aircraft may be indicated using pressure that is input into a pitot tube of the aircraft.

The pitot tube denotes an instrument to measure the airspeed of the aircraft and thus may measure a difference between a total pressure of fluid flow and a static pressure of fluid flow, and calculate a velocity of fluid based on the measured difference Even when the aircraft barely moves in relation to the surface of the earth, the natural wind may flow into an inlet of the pitot tube. A velocity corresponding to the pressure of the in-flowed air of the natural wind may be indicated on the airspeed indicator of the aircraft.

Generally, only during an aircraft manufacturing process and periodical testing may a test be performed for the airspeed indicator. This is due to an existing test tool being very expensive and —being complex in its operation. In addition, only a skilled person having completed courses of an airspeed test education may operate the test tool. Accordingly, the airspeed indicator may not be tested at all desired times.

Since the airspeed indicator may not be tested at all desired times, a malfunction of the airspeed indicator may not be identified at an early stage and damage to the airspeed indicator may go undetected, which may result in compromising a safe flight of the aircraft.

SUMMARY

An aspect of the present invention provides a test tool and method for an airspeed indicator of an aircraft that may enable manufacturing of an airspeed indicator test tool with a simple operation scheme at inexpensive costs, and thus enable general use of the airspeed indicator.

According to an aspect of the present invention, there is provided a test tool for an airspeed indicator of an aircraft that is connected to a pitot tube of the aircraft to test an airspeed of the aircraft, the test tool including: a cylinder portion being a cylindrical member that includes an insertion groove with a predetermined amount of space, and of which one end is sealed by a cover and includes an injection portion on one side of the cover so that the insertion groove may pass through one end of the pitot tube, and of which another end is open and includes a protruded step around its inner circumferential surface; a piston portion being inserted into the insertion groove of the cylinder portion to reciprocally move within the insertion groove, and comprising a protrusion portion that has a size and a shape corresponding to an aperture of the insertion groove, and a knob portion that is extended from one side of the protrusion portion and is provided in a bar shape; and a display portion being formed of a transparent material on one side of an outer surface of the cylinder portion to display a location of the protrusion portion reciprocally moving within the cylinder portion.

The cylinder portion may further include an air pressure tube in a shape of a cylindrical pipe. One end of the air pressure tube may be connected to one end of the injection portion, and another end of the air pressure tube may be connected to one end of the pitot tube, whereby the insertion groove may pass through the one end of the pitot tube.

The test tool may further include a fixing portion being a ring-shaped member that is provided to surround one side of the outer surface of the knob portion, being provided on one side of the other end of the cylinder portion, comprising at least one fixing hole that is formed on its outer circumferential surface at a vertical angle with respect to the outer surface of the knob portion, the at least one fixing hole including a fixing unit to press the outer surface of the knob portion, to thereby fix a reciprocal movement of the protrusion portion.

A spiral A may be formed in an inner surface of the fixing hole, and a spiral B having a size and a shape corresponding to the spiral A may be formed on the outer surface of the fixing portion. The fixing portion may be rotatably inserted into the fixing hole to press the outer surface of the knob portion.

According to another aspect of the present invention, there is provided a test method for an aircraft airspeed of an indicator, the method including: a) a reference velocity marking operation of marking at least one reference velocity on a display portion of a cylinder portion based on a gauge scale of a test-completed airspeed indicator of an aircraft that is increased by advancing a protrusion portion of the cylinder portion, in a state where one end of a pitot tube of the aircraft with the test-completed airspeed indicator may pass through an injection portion of the cylinder to portion; b) a test preparation operation of filling the air within an insertion groove of the cylinder portion by maximally withdrawing the protrusion portion of the cylinder portion after disconnecting the pitot tube and the injection portion from each other; and c) a speed verifying operation of comparing a gauge scale of an airspeed indicator of an aircraft to be tested and the marked reference velocity after advancing the protrusion portion of the cylinder portion until the reference velocity reaches a marked location in a state where one end of a pitot tube of the aircraft with the airspeed indicator to be tested and the injection portion of the cylinder portion are connected to each other.

When the protrusion portion of the cylinder portion reaches a marked location of the reference velocity, the c) operation may compare the gauge scale of the airspeed indicator of the aircraft to be tested and the marked reference velocity after fixing a movement of the protrusion portion using a fixing portion provided on another end of the cylinder portion.

EFFECT

According to embodiments of the present invention, there may be provided a test tool and method for an airspeed indicator of an aircraft that may enable manufacturing of an airspeed indicator test tool at inexpensive costs using an inexpensive material. In addition, since an operation scheme and an operation principle are simple, the test tool may be easily used.

Also, since it is possible to test an operational state of the airspeed indicator of the aircraft as desired, a malfunction of the airspeed indicator may be identified at an early stage, which may result in preventing an accident with the aircraft.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
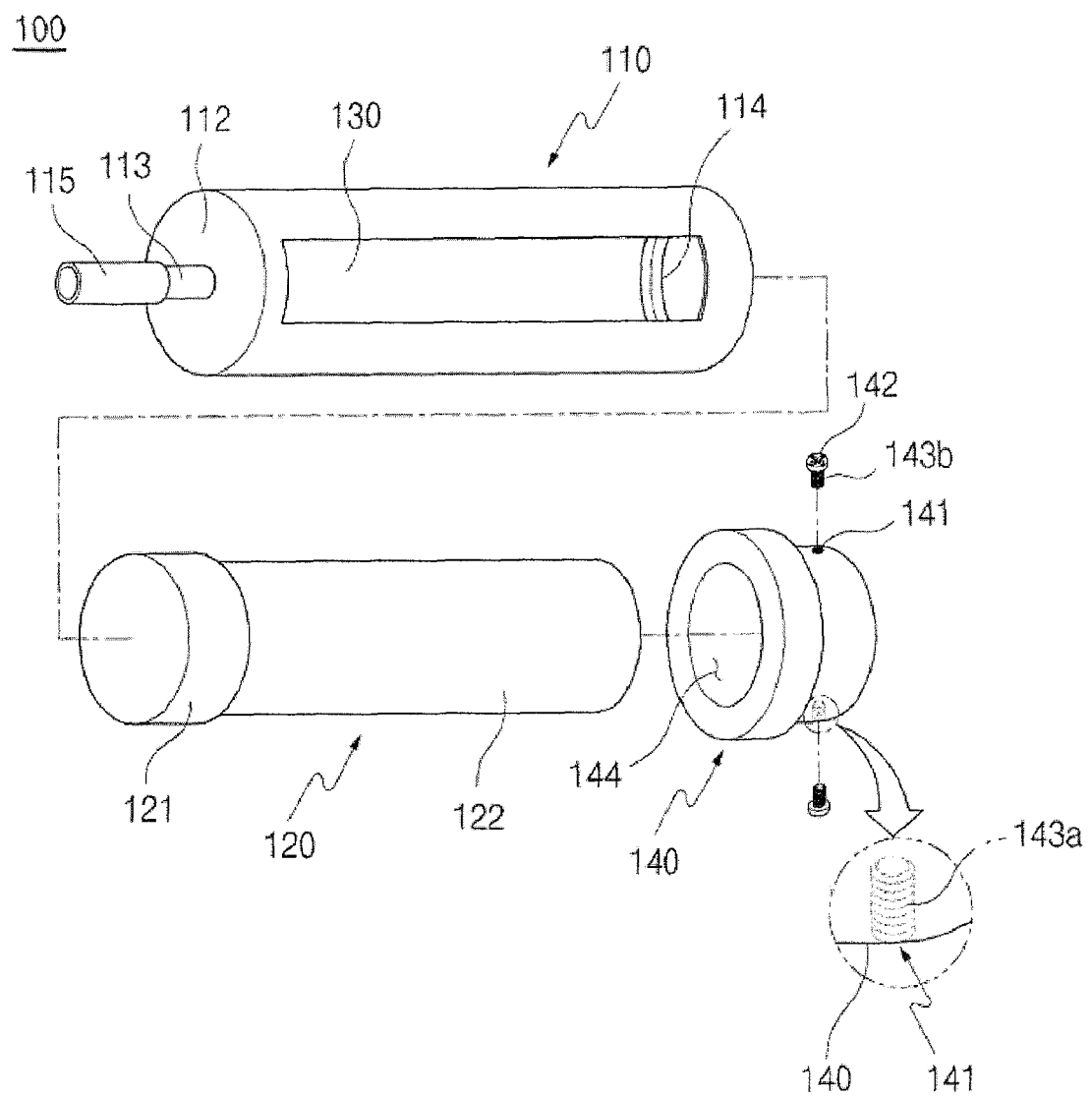
FIG. 1 is an exploded perspective view illustrating a configuration of a test tool for an airspeed indicator of an aircraft according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described with reference to the accompanying drawings. Terminologies or terms used throughout the present specification or claims should not be interpreted as general or lexical meaning, and may nee to be understood as meaning and concepts corresponding to technical spirit of the invention based on a principle that the inventor may appropriately define the terms to describe the inventor's invention according to a best mode.

Accordingly, embodiments and drawings of the present invention are only examples and thus may not represent all the technical spirit of the invention. Accordingly, it may be understood that the scope of the invention may be defined by various equivalents and modifications.

Hereinafter, a test tool for an airspeed indicator of an aircraft according to an embodiment of the present invention.

Figure 2:
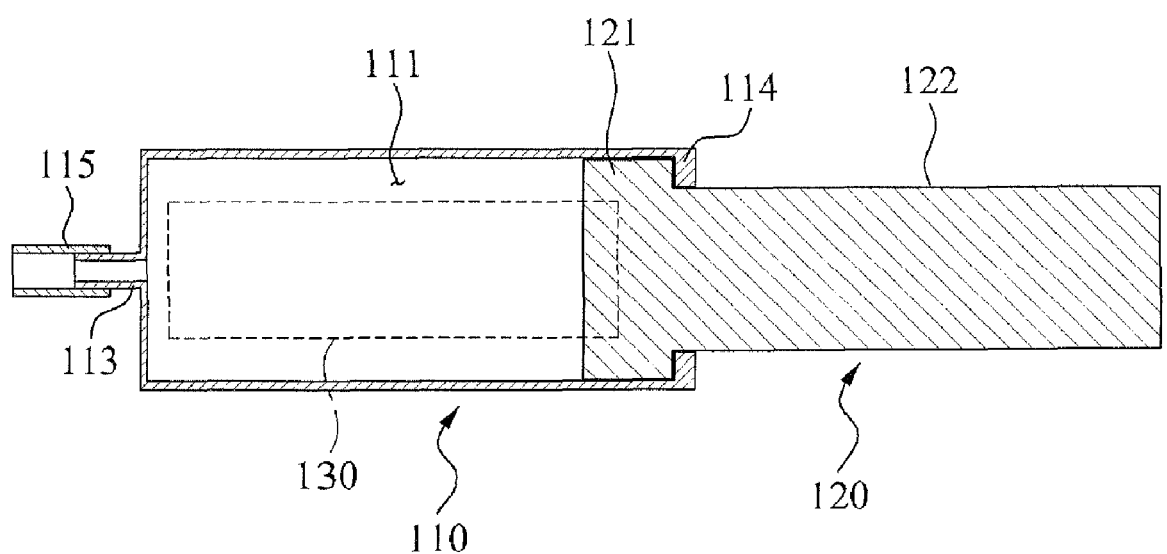
FIG. 2 is a cross-sectional view for describing a state where a protrusion portion of the aircraft airspeed indicator test tool of FIG. 1 is maximally withdrawn.
Figure 3:
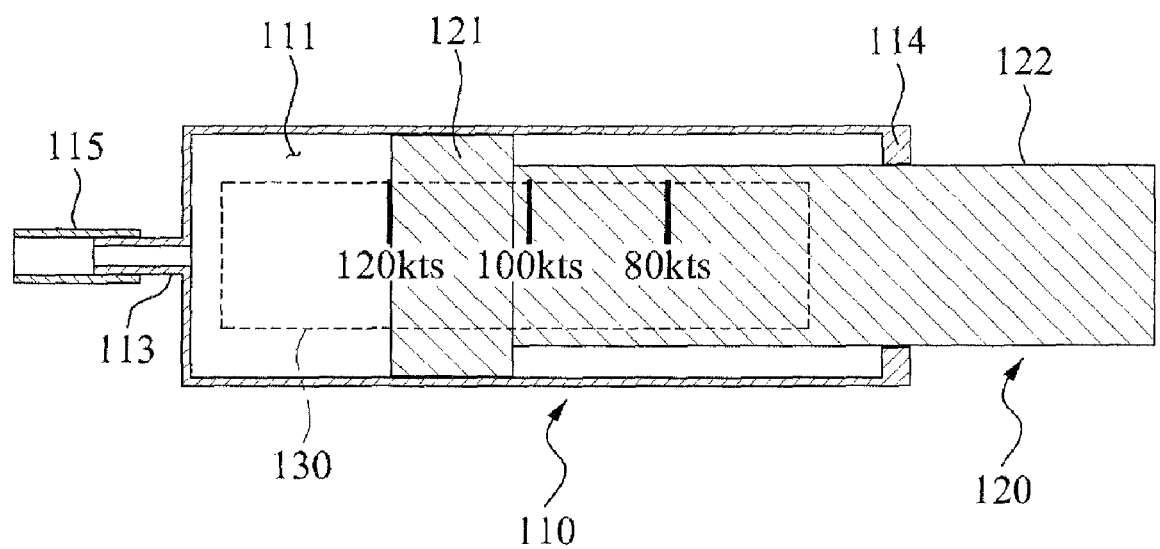
FIG. 3 is a cross-sectional view for describing a state where a reference velocity is marked on a display portion according to an advance of the protrusion portion of the aircraft airspeed indicator test tool of FIG. 1.
Figure 4:
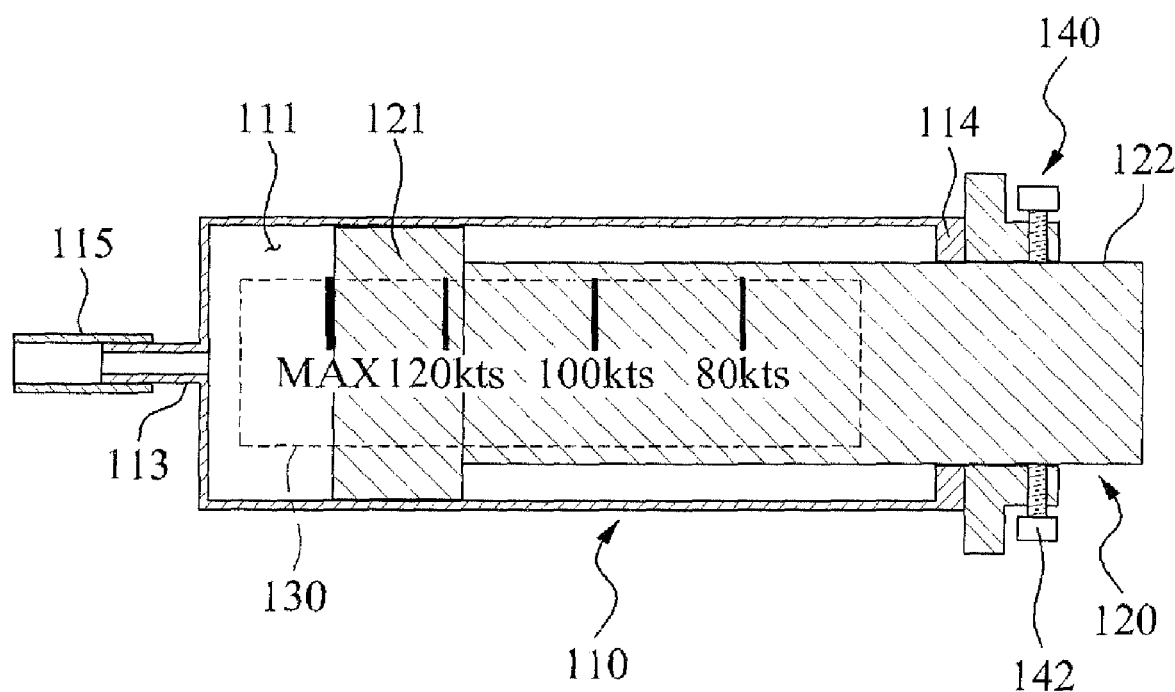
FIG. 4 is a cross-sectional view for describing a state where a maximum velocity of a speed gauge of the aircraft of FIG. 1 to be tested is marked.

FIG. 1 is an exploded perspective view illustrating a configuration of a test tool 100 for an airspeed indicator of an aircraft according to an embodiment of the present invention, FIG. 2 is a cross-sectional view illustrating a state where a protrusion portion 121 of the aircraft airspeed indicator test tool 100 is maximally withdrawn, FIG. 3 is a cross-sectional view illustrating a state where a reference velocity is marked on a display portion 130 according to an advance of the protrusion portion 121 of the aircraft airspeed indicator test tool 100, and FIG. 4 is a cross-sectional view illustrating a state where a maximum speed of a speed gauge of the aircraft to be tested is marked.

Referring to FIGS. 1 through 4, the aircraft airspeed indicator test tool 100 may include a cylinder portion 110, a piston portion 120, the display portion 130, and a fixing portion 140.

The cylinder portion 110 corresponds to a cylindrical member that includes an insertion groove 111 with a predetermined amount of space. One end of the cylinder portion 110 may be sealed by a cover 112 and include an injection portion 113 on one side of the cover 112 so that the insertion groove 111 may pass through one end of a pitot tube (not shown) of the aircraft. Another end of the cylinder portion 110 may be open and include a protruded step 114 around its inner circumferential surface.

Here, the predetermined amount of space of the insertion groove 111 may be different depending on an amount of air, that is, the air pressure that may be input into the pitot tube of the aircraft to be tested.

The air filled in the space of the insertion groove 111 may flow into the pitot tube. In this instance, the inner air pressure may increase in proportion to an amount of air flowing into the pitot tube, whereby a gauge of the airspeed indicator may increase. Accordingly, the size of the insertion groove 111 may be determined based on a maximum velocity gauge value that may be indicated by the airspeed indicator.

Also, the cylinder portion 110 may further include an air pressure tube 115 in a shape of a cylindrical pipe. One end of the air pressure tube 115 may be connected to one end of the injection portion 113, and another end of the air pressure tube 115 may be connected to one end of the pitot tube, whereby the insertion groove 111 may pass through the one end of the pitot tube.

Here, the air pressure tube 115 may be formed of a rubber material and when connecting the one end of the injection portion 113 and the one end of the pitot tube, a sealed state may be maintained where the air may not be externally leaked.

The piston portion 120 may be inserted into the insertion groove 111 of the cylinder portion 110 to reciprocally move within the insertion groove 111. The piston portion 120 may include the protrusion portion 121 that has a size and a shape corresponding to an aperture of the insertion groove 111, and a knob portion 122 that is extended from one side of the protrusion portion 121 and is provided in a bar shape.

Here, since the protrusion portion 121 is provided to have the size and the shape corresponding to the aperture of the insertion groove 111, the protrusion portion 121 may be supported by the protruded step 114 having a relatively narrower aperture than the protrusion portion 121. Accordingly, the protrusion portion 121 may reciprocally move within the insertion groove 111 without being separated from the open other end of the cylinder portion 110.

Also, an aperture of the knob portion 122 may be provided to be less than the aperture of the protruded step 114, so that the protrusion portion 121 may smoothly perform a reciprocal motion within the insertion groove 111.

Due to the above combined configuration of the cylinder portion 110 and the piston portion 120, the protrusion portion 121 may advance towards the injection portion 113 within the insertion groove 111 by an operation of pushing the knob portion 122, whereby the air filled in the insertion groove 111 may flow into the pitot tube of the aircraft via the injection portion 113. Also, by an operation of pulling the knob portion 122, the protrusion portion 121 may be withdrawn towards the open other end of the cylinder portion 110 within the insertion groove 111, whereby the air flowing into the pitot tube may flow again into the inside of the insertion groove 111.

Here, the protrusion portion 121 may be formed of a rubber material while having a size and a shape corresponding to the aperture of the insertion groove 111 to move the air filled within the insertion groove in a sealed state within the insertion groove 111.

Through the above configuration, even when the inner air pressure of the insertion groove 111 increases due to the advance of the protrusion portion 121, the air filled between the injection portion 113 and the protrusion portion 121 may not flow out to the open other end of the cylinder portion 110 via a contact gap between an outer surface of the protrusion portion 121 and an inner surface of the insertion groove 111.

The display portion 130 may be formed of a transparent material on one side of an outer surface of the cylinder portion 110 to display a location of the protrusion portion 121 reciprocally moving within the cylinder portion 110.

Here, the display unit 130 may be formed of the transparent material, for example, a material where marking of the location of the protrusion portion 121 is easily performed by using a pen, a pencil, and the like.

The fixing portion 140 corresponds to a ring-shaped member that is provided to surround one side of the outer surface of the knob portion 122. The fixing portion 140 may be provided on one side of the other end of the cylinder portion 110. At least one fixing hole 141 may be formed on an outer circumferential surface of the fixing portion 140 at a vertical angle with respect to the outer surface of the knob portion 122. The fixing hole 141 may include a fixing unit 142 to press the outer surface of the knob portion 122. Through this, the fixing portion 140 may fix a reciprocal movement of the protrusion portion 121.

Hereinafter, a test method for an airspeed indicator of an aircraft according to an embodiment of the present invention will be described.

The aircraft airspeed indicator test method may include a reference velocity marking operation, a test preparation operation, and a speed verifying operation.

In the reference velocity marking operation, in a state where one end of a pitot tube of an aircraft with a test-completed airspeed indicator may pass through the injection portion 113 of the cylinder portion 110, at least one reference velocity may be marked on the display portion 130 of the cylinder portion 110 based on a gauge scale of the airspeed indicator of the aircraft that is increased by advancing the protrusion portion 121 of the cylinder portion 110.

Here, the aircraft (hereinafter, "aircraft A") with the test-completed airspeed indicator indicates an aircraft in a state where a periodical test for the aircraft and an airspeed indicator of the aircraft are completed. Specifically, the aircraft A indicates an aircraft having a reliable operational performance of the airspeed indicator since the test is completed using an existing expensive airspeed test instrument.

Also, as shown in FIG. 2, prior to connecting the one end of the pitot tube of the aircraft A and the injection portion 113, it may be desirable to connect the pitot tube and the injection portion 113 in a state where the protrusion portion 121 is maximally withdrawn within the insertion groove 111 of the cylinder portion 110.

In addition, when connecting the pitot tube and the injection portion 113, one end of the air pressure tube 115 may be connected with one end of the injection portion 113 using the air pressure tube 115 in the shape of the cylindrical pipe. The insertion groove 111 may pass through the one end of the pitot tube by connecting another end of the air pressure tube 115 and the one end of the pitot tube.

In a state where the insertion groove 111 and the pitot tube are connected with each other, when the protrusion portion 121 is pressurized to advance within the insertion groove 111 by pushing the knob portion 122, the air filled within the insertion groove 111 may be pressurized by the protrusion portion 121 and thereby flow into the pitot tube via the injection portion 113.

The inner air pressure of the pitot tube may increase due to the air flowing into the pitot tube, whereby the gauge scale of the aircraft A may increase.

When the airspeed indicator reaches a reference velocity while slowly advancing the protrusion portion 121, a movement of the protrusion portion 121 may be fixed. In this state, a velocity indicated by the gauge scale of the airspeed indicator may be marked on the display portion 130.

Here, the reference velocity denotes a velocity arbitrarily determined by a user and thus may be determined based on a predetermined unit so that the user may easily verify the gauge scale of the airspeed indicator. For example, as shown in FIG. 3, the predetermined unit may be marked based on 20 kts. The user may determine the reference velocity having a readily recognizable unit.

While continuously advancing the protrusion portion 121, each reference velocity may be marked on the display unit 130. In this instance, a maximum velocity that may be indicated by the gauge scale of the airspeed indicator of the aircraft A may be marked as a last reference velocity.

While the protrusion portion 121 is advancing, the air may continuously flow into the pitot tube of the aircraft A, whereby the inner air pressure of the pitot tube may also increase. In this instance, when the air exceeding the maximum velocity flows into the pitot tube, the airspeed indicator of the aircraft A may be damaged. Accordingly, it is possible to prevent the above described damage by marking the maximum velocity as the last reference velocity.

When the reference velocity marking operation of marking, on the display portion 130, the reference velocity arbitrarily determined by the user is completed, the air may be filled within the insertion groove 111 of the cylinder portion 110 by maximally withdrawing the protrusion portion 121 of the cylinder portion 110 after disconnecting the pitot tube and the injection portion 113 from each other in operation.

In a state where one end of a pitot tube of an aircraft (hereinafter, "aircraft B") with an airspeed indicator to be tested and the injection portion of the cylinder portion 113 are connected to each other, a gauge scale of the airspeed indicator of the aircraft B and the marked reference velocity may be compared after advancing the protrusion portion of the cylinder portion 110 until the reference velocity reaches a marked location in operation.

Here, when the protrusion portion 121 of the cylinder portion 110 reaches the marked location of the reference velocity, the marked velocity of the reference velocity may be compared with the gauge scale of the airspeed indicator of the aircraft B by fixing the movement of the protrusion portion 121. In this instance, the above comparison may be performed after fixing the movement of the protrusion portion 121 using the fixing portion 140 provided on one side of the cylinder portion 110.

When the gauge scale of the airspeed indicator of the aircraft B matches the corresponding reference velocity, it may be regarded that the airspeed indicator of the aircraft B normally functions. However, when the airspeed indicator of the aircraft B indicates that airspeed is reduced (*when the gauge of the airspeed indicator of the aircraft B indicates that airspeed is decreased in a state where the movement of the protrusion portion 121 is fixed, it may be regarded that an air pressure pipe or the airspeed indicator of the aircraft B is malfunctioning.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A test tool for an airspeed indicator of an aircraft that is connected to a pitot tube of the aircraft to test an airspeed of the aircraft, the test tool comprising:
    a cylinder portion being a cylindrical member that includes an insertion groove with a predetermined amount of space, and of which one end is sealed by a cover and includes an injection portion on one side of the cover so that the insertion groove passes through one end of the pitot, and of which another end is open and includes a protruded step around its inner circumferential surface;
    a piston portion being inserted into the insertion groove of the cylinder portion to reciprocally move within the insertion groove, and comprising a protrusion portion that has a size and a shape corresponding to an aperture of the insertion groove, and a knob portion that is extended from one side of the protrusion portion and is provided in a bar shape; and
    a display portion being formed of a transparent material on one side of an outer surface of the cylinder portion to display a location of the protrusion portion reciprocally moving within the cylinder portion.

2. The test tool of claim 1, wherein:
    the cylinder portion further comprises an air pressure tube in a shape of a cylindrical pipe, and
    one end of the air pressure tube is connected to one end of the injection portion, and another end of the air pressure tube is connected to one end of the pitot tube, whereby the insertion groove passes through the one end of the pitot tube.

3. The test tool of claim 1, further comprising:
    a fixing portion being a ring-shaped member that is provided to surround one side of the outer surface of the knob portion, being provided on one side of the other end of the cylinder portion, and comprising at least one fixing hole that is formed on its outer circumferential surface at a vertical angle with respect to the outer surface of the knob portion, the at least one fixing hole including a fixing unit to press the outer surface of the knob portion, to thereby fix a reciprocal movement of the protrusion portion.

4. The test tool of claim 3, wherein a spiral A is formed in an inner surface of the fixing hole, and a spiral B having a size and a shape corresponding to the spiral A is formed on the outer surface of the fixing portion, and
    the fixing portion is rotatably inserted into the fixing hole to press the outer surface of the knob portion.

5. A test method for an aircraft airspeed of an indicator, the method comprising:
    a) a reference velocity marking operation of marking at least one reference velocity on a display portion of a cylinder portion based on a gauge scale of a test-completed airspeed indicator of an aircraft that is increased by advancing a protrusion portion of the cylinder portion, in a state where one end of a pitot tube of the aircraft with the test-completed airspeed indicator passes through an injection portion of the cylinder portion;
    b) a test preparation operation of filling the air within an insertion groove of the cylinder portion by maximally withdrawing the protrusion portion of the cylinder portion after disconnecting the pitot tube and the injection portion from each other; and
    c) a speed verifying operation of comparing a gauge scale of an airspeed indicator of an aircraft to be tested and the marked reference velocity after advancing the protrusion portion of the cylinder portion until the reference velocity reaches a marked location in a state where one end of a pitot tube of the aircraft with the airspeed indicator to be tested and the injection portion of the cylinder portion are connected to each other.

6. The method of claim 5, wherein, when the protrusion portion of the cylinder portion reaches a marked location of the reference velocity, the c) speed verifying operation compares the gauge scale of the airspeed indicator of the aircraft to be tested and the marked reference velocity after fixing a movement of the protrusion portion using a fixing portion provided on another end of the cylinder portion.

* * * * *